US008002326B2

(12) United States Patent
Neubrand

(10) Patent No.: US 8,002,326 B2
(45) Date of Patent: Aug. 23, 2011

(54) CONVERTIBLE TOP HAVING OVER CENTER BACKLIGHT

(75) Inventor: Frank Neubrand, West Bloomfield, MI (US)

(73) Assignee: Wilhelm Karmann GmbH, Munich (DE)

(*) Notice: Subject to any disclaimer, the term of this patent is extended or adjusted under 35 U.S.C. 154(b) by 0 days.

(21) Appl. No.: 11/962,982

(22) Filed: Dec. 21, 2007

(65) Prior Publication Data
US 2009/0160209 A1   Jun. 25, 2009

(51) Int. Cl.
*B60J 7/00* (2006.01)
(52) U.S. Cl. .............. 296/107.07; 296/146.14; 296/117
(58) Field of Classification Search ............. 296/107.07, 296/116, 117, 122, 107.09, 120.1, 146.14
See application file for complete search history.

(56) References Cited

U.S. PATENT DOCUMENTS

| 286,272 | A |  | 10/1883 | Davis |
|---|---|---|---|---|
| 2,560,496 | A |  | 7/1951 | Vigmostad |
| 2,704,226 | A | * | 3/1955 | Orr ................................ 296/117 |
| 4,720,133 | A |  | 1/1988 | Alexander et al. |
| 4,991,902 | A | * | 2/1991 | Schrader et al. ......... 296/107.09 |
| RE34,033 | E | * | 8/1992 | Godette .................... 296/107.07 |
| 5,375,901 | A | * | 12/1994 | Agosta et al. ............. 296/146.14 |
| 5,749,619 | A |  | 5/1998 | Mentink et al. |
| 5,788,316 | A | * | 8/1998 | Rothe ....................... 296/107.07 |
| 5,816,644 | A |  | 10/1998 | Rothe et al. |
| 5,829,821 | A | * | 11/1998 | Aydt et al. ....................... 296/122 |
| 6,302,470 | B1 | * | 10/2001 | Maass et al. ............. 296/107.07 |
| 6,454,342 | B2 | * | 9/2002 | Heselhaus et al. ....... 296/107.07 |
| 6,513,857 | B2 | * | 2/2003 | Pfertner et al. .......... 296/107.07 |
| 6,592,169 | B2 | * | 7/2003 | Obendiek ................ 296/107.07 |
| 6,629,719 | B2 | * | 10/2003 | Sims ............................ 296/109 |
| 6,871,899 | B2 | * | 3/2005 | Mandl et al. ............. 296/107.12 |
| 6,966,599 | B2 | * | 11/2005 | Willard .................... 296/107.12 |
| 2003/0057728 | A1 |  | 3/2003 | Sims |
| 2003/0146642 | A1 |  | 8/2003 | Mandl et al. |
| 2004/0012222 | A1 |  | 1/2004 | Hollenbeck et al. |
| 2005/0189781 | A1 |  | 9/2005 | Powell |
| 2005/0206197 | A1 | * | 9/2005 | Troeger et al. ........... 296/187.09 |
| 2007/0152469 | A1 |  | 7/2007 | Papendorf et al. |
| 2008/0265612 | A1 | * | 10/2008 | Quindt ......................... 296/108 |

FOREIGN PATENT DOCUMENTS

| WO | WO2007/062109 | * | 5/2007 |
|---|---|---|---|
| WO | WO02007062109 | * | 5/2007 |

* cited by examiner

*Primary Examiner* — Glenn Dayoan
*Assistant Examiner* — Pinel E Romain
(74) *Attorney, Agent, or Firm* — Gifford, Krass, Sprinkle, Anderson & Citkowski, P.C.; Douglas L. Wathen

(57) ABSTRACT

A linkage of a convertible top supports a portion of a cover and provides movement of the top between an extended position extending over a passenger compartment and a retracted position. A rear bow supports a rear edge of the cover and articulates the rear edge of the cover during movement of the top between the extended and retracted positions. The top also includes a backlight assembly having a rear window and supporting a rear portion of the cover. The backlight assembly forms part of an articulating mechanism that moves the rear bow.

12 Claims, 5 Drawing Sheets

CONVERTIBLE TOP HAVING OVER CENTER BACKLIGHT

FIELD OF THE INVENTION

The invention relates to convertible top linkage mechanisms. More particularly, the invention relates to a backlight assembly that serves as a member of articulating mechanisms for retaining a portion of the top in a closed position.

BACKGROUND OF THE INVENTION

Convertible vehicles have tops that are movable between an extended position covering a passenger compartment and a retracted position disposed within a storage space, typically in a rear portion of the vehicle. A convertible top typically includes a linkage mechanism that provides support to the top and also allows the movement of the top between the extended and retracted positions. Optionally, drive mechanisms or actuators are used for automating the movement of the top between the extended and retracted positions.

Convertible tops have roof covers that are soft, rigid or a combination thereof. In soft-top designs, a rear bow is typically used to support a rear edge of the roof cover and to move the rear edge of the roof cover between the extended and retracted positions. In conventional convertible top designs, it is not difficult for one to forcibly lift the rear bow from the extended position to gain access to the passenger compartment. Thus, it remains desirable to design a convertible top with a mechanism for retaining the linkage and, in particular, the rear bow in the closed position by making it difficult to lift the rear bow from the closed position.

SUMMARY OF THE INVENTION

The present invention provides a convertible top for a motor vehicle having a cover and a linkage supporting a portion of the cover. The linkage provides movement of the top between an extended position extending over a passenger compartment and a retracted position disposed in a storage space adjacent the passenger compartment. A rear bow supports a rear edge of the cover, and articulates the rear edge of the cover during movement of the top between the extended and retracted positions. The rear bow is movable between a closed position disposed adjacent to a body panel of the motor vehicle and a generally upwardly raised open position. A backlight assembly has a rear window and supports a rear portion of the cover. The backlight assembly is a link in an articulating mechanism that provides movement of the rear bow during movement of the top between the extended and retracted positions.

According to another embodiment of the invention, a convertible top for a motor vehicle includes a cover, a backlight assembly and a linkage. The backlight assembly has a rear window and supports a rear portion of the cover. The linkage supports portions of the cover forward of the backlight assembly. The linkage provides movement of the top between an extended position extending over a passenger compartment and a retracted position disposed in a storage space adjacent the passenger compartment. A rear bow supports a rear edge of the cover and articulates the rear edge of the cover during movement of the top between the extended and retracted positions. The rear bow is movable between a closed position disposed adjacent to a body panel of the motor vehicle and a generally upwardly raised open position. An overcenter arrangement is operatively coupled between the linkage and the rear bow for retaining the rear bow in the extended position. The overcenter arrangement has first and second members pivotally coupled to each other by a pivot movable in and out of an overcenter position during movement of the top between the extended and retracted positions, respectively. The backlight assembly forms one of the first or second members of the overcenter arrangement.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
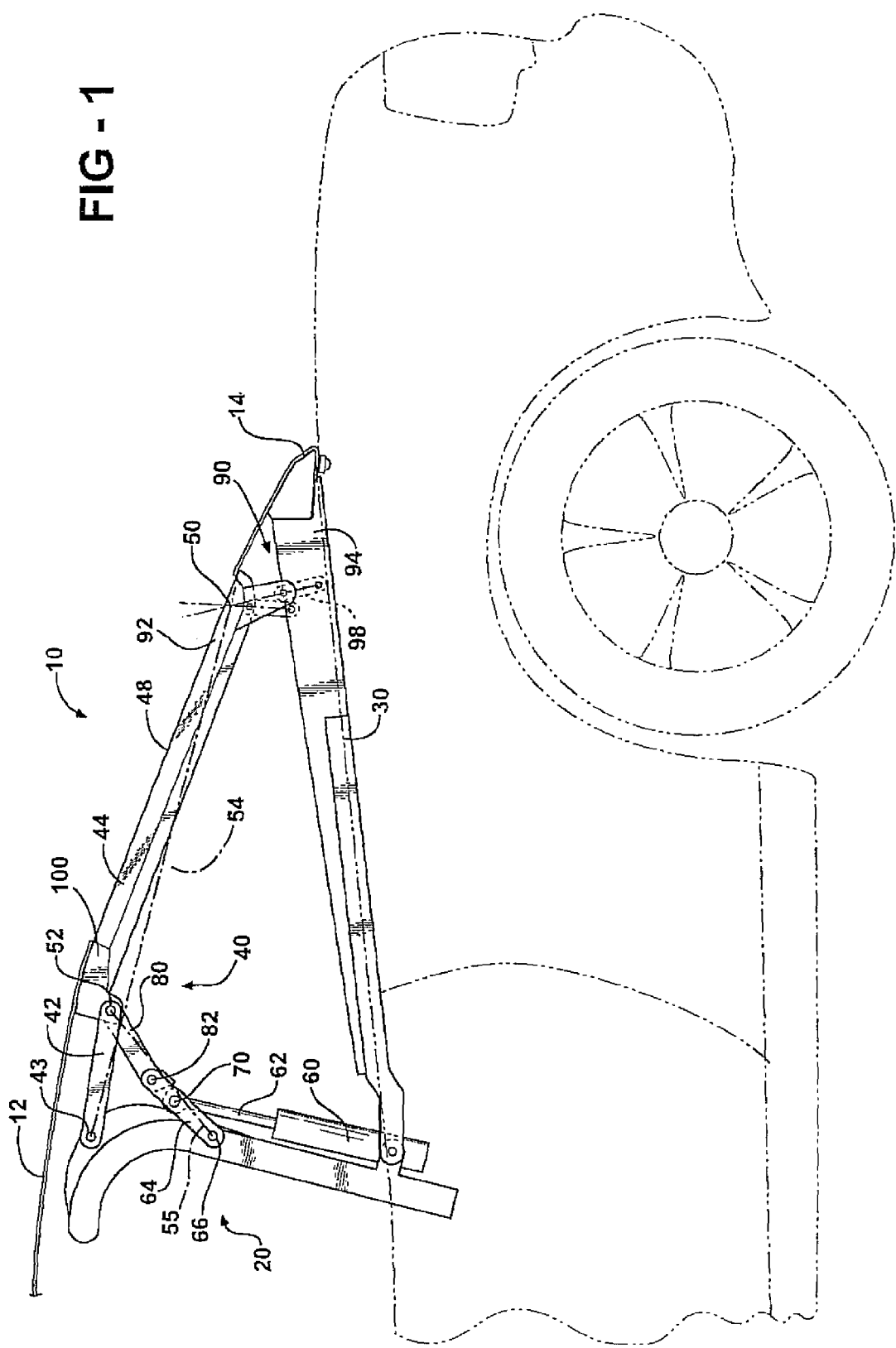
FIG. 1 is a side elevational view of a motor vehicle having a convertible top according to the invention, with a rear bow of the top shown in a closed position.
Figure 2:
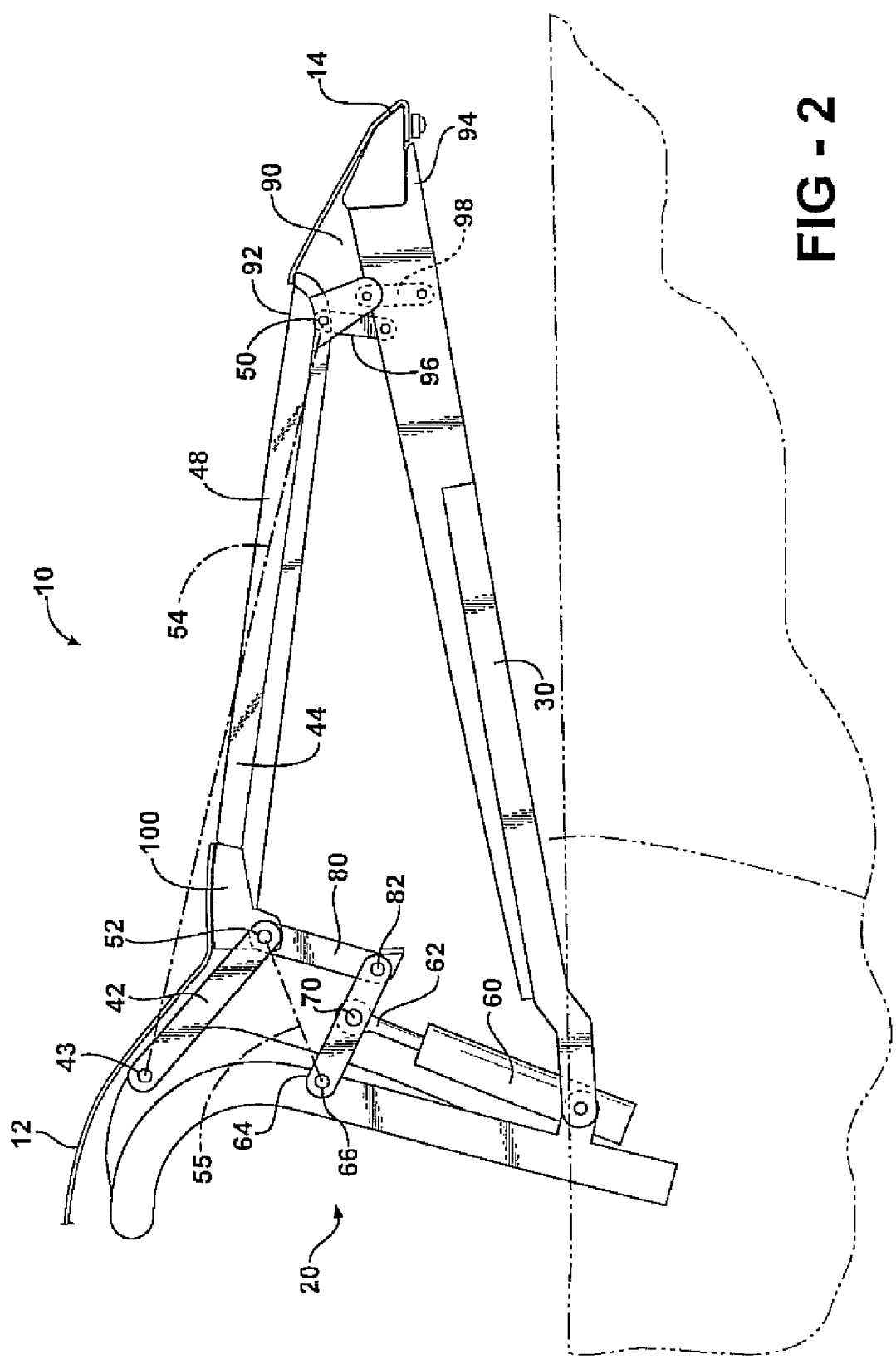
FIGS. 2-4 are side elevational views showing intermediate positions of the rear bow of the top between the closed position and an open position.
Figure 3:
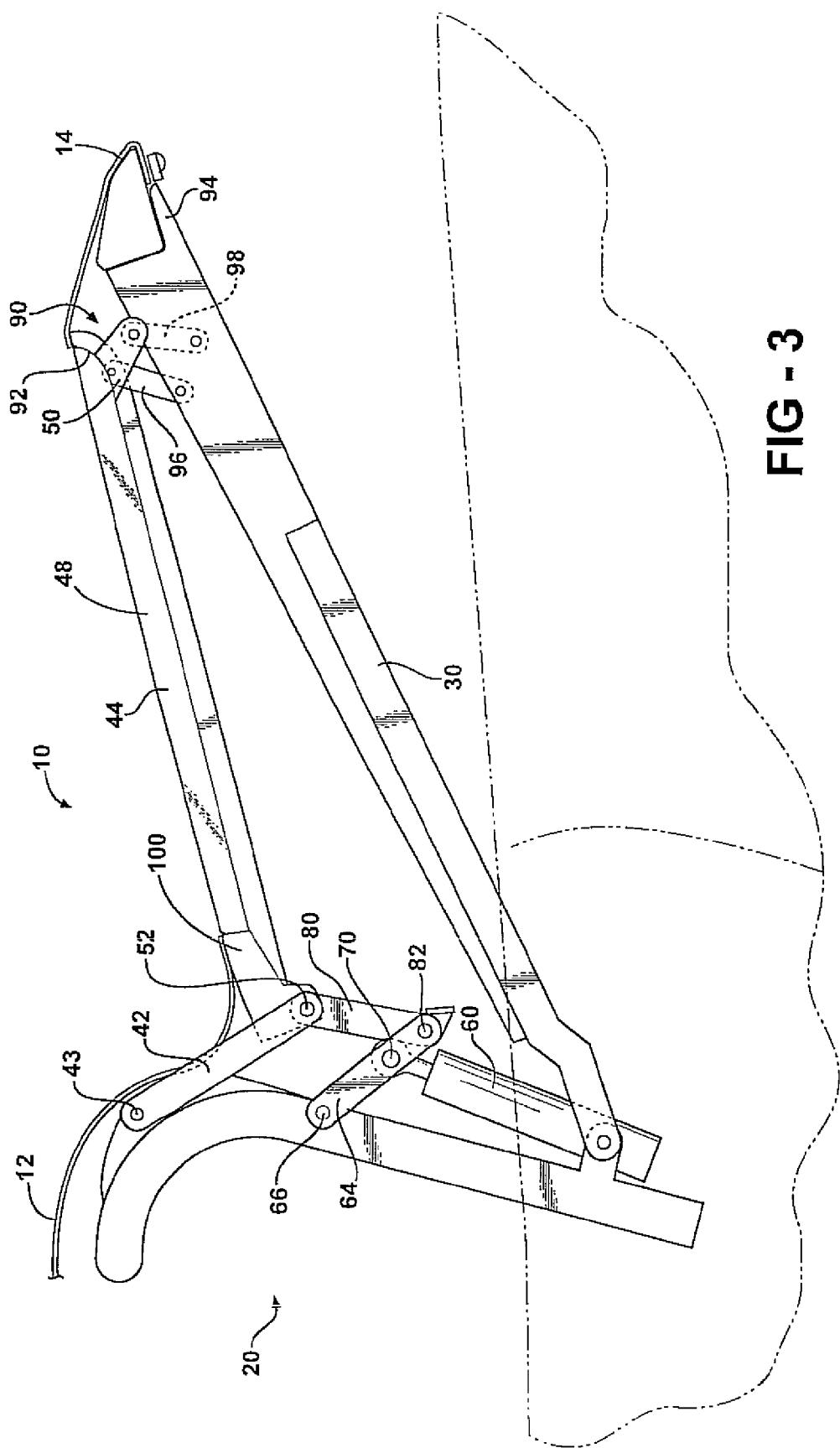
Figure 4:
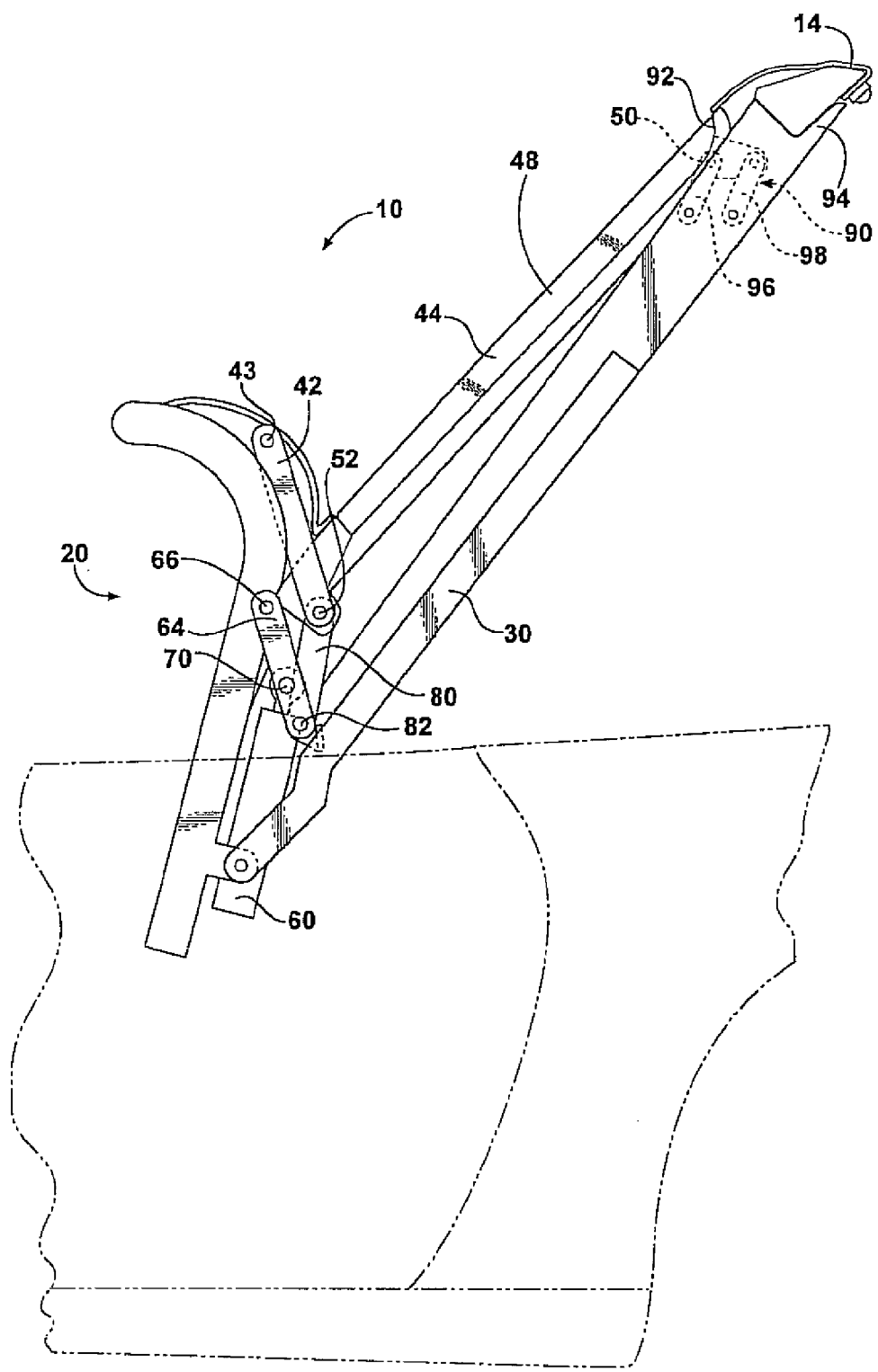
Figure 5:
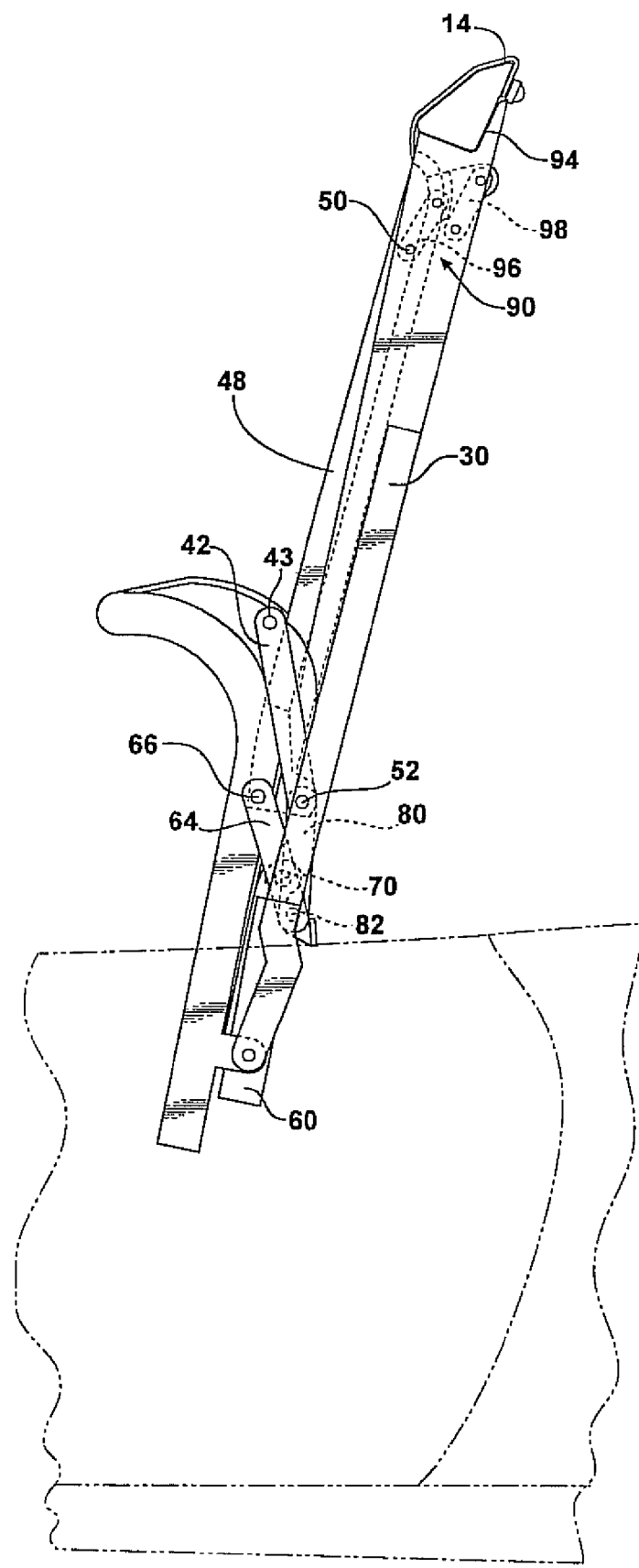
FIG. 5 is a side elevational view showing the rear bow of the top in an upwardly raised open position.

Referring to the figures, a convertible top for a motor vehicle is generally indicated at 10. The top 10 includes a flexible cover 12. The top 10 also includes a linkage 20 that supports the front portion of the cover 12. The linkage 20 provides movement of the top 10 between an extended position extending over a passenger compartment in the vehicle and a retracted position folded in a storage space adjacent the passenger compartment. As will be clear to those of skill in the art, the linkage 20 may include additional members that extend forwardly of the illustrated member to support the cover and to interconnect with the windshield header of the vehicle. The top 10 also includes a rear bow 30 for supporting a rear edge 14 of the cover 12. In the illustrated embodiment, the forward end of the rear bow 30 is pivotally coupled to the linkage 20 near where the linkage connects to the body. As such, the rear bow 30 may be said to be pivotally coupled to the vehicle body. The rear bow articulates the rear edge 14 of the cover 12 during movement of the top 10 between the extended and retracted positions. The rear bow 30 is movable between a closed position, as shown in FIG. 1, and a generally upwardly raised open position just prior to movement of the top to the retracted position, as shown in FIG. 5. In the closed position, the rear bow 30 may be said to be disposed adjacent a body panel (shown in phantom lines) of the vehicle. Intermediate positions of the rear bow 30 between the closed position and the generally upwardly raised open position are shown in FIGS. 2-4. Described in greater detail below, the top 10 also includes an overcenter arrangement 40 operatively coupled between the linkage 20 and the rear bow 30 for facilitating retention of the rear bow 30 in the closed position.

The overcenter arrangement 40 includes a link 42 pivotally coupled to the linkage 20 by a first pivot 43. A backlight assembly 44 having a rear window 48 is pivotally coupled to the fear bow 30 by a second pivot 50. The second pivot 50 may be a momentary pivot defined by a four-bar linkage 90 that pivotally interconnects a bottom end 92 of the backlight assembly 44 and the rear bow 30. The rear four-bar linkage 90 allows articulation of the backlight assembly 44 relative to the rear bow 30 during movement of the top 10 between the closed and open positions without overtensioning the cover 12. The four-bar linkage 90 includes a first member 96 and a second member 98. Each member 96, 98 includes one end pivotally coupled to the bottom end 92 of the backlight assembly 44 and an opposite end pivotally coupled to a distal end 94 of the rear bow 30. Alternatively, the second pivot may be defined by a simple pivotal connection between the backlight assembly 44 and the rear bow 30 or a different linkage arrangement.

The backlight assembly 44 and the link 42 are pivotally coupled to each other by a third pivot 52. The first pivot 43 and second pivot 50 define a first overcenter line 54. The third pivot 52 is movable in and out of an overcenter position. In the overcenter position, the third pivot 52 is disposed above the first overcenter line 54 when the top is in the extended position to maintain the rear bow 30 in the closed position. The third pivot 52 is out of the overcenter position below the first overcenter line 54 to allow relative pivotal movement between the link 42 and the backlight assembly 44 and, in turn, articulation of the rear bow 30 during movement of the top 10 between the extended and retracted positions.

An actuator 60 is provided for moving the third pivot 52 in and out of the overcenter position. The actuator 60 may be a linear actuator with one end coupled to the vehicle body or linkage 20 and an opposite actuated end 62 coupled to a member of the overcenter arrangement 40. In the illustrated embodiment, an actuator linkage interconnects the actuator 60 with the overcenter arrangement 40. The actuator linkage includes a drive link 64 and a connector link 80. The drive link 64 is pivotally coupled at one end thereof to a member of the linkage 20 by a fourth pivot 66. The drive link 64 is pivotally coupled to the actuated end 62 of the actuator 60 by a fifth pivot 70. The connector link 80 is pivotally coupled at one end thereof to the third pivot 52. Alternatively, the connector link 80 may be pivotally coupled to the overcenter arrangement 40 in a different location. The connector link 80 is also pivotally coupled to drive link 64 by a sixth pivot 82. In the illustrated embodiment, the fifth pivot 70 connecting the actuator 60 to the drive link 64 is disposed between the fourth 66 and sixth 82 pivots.

Alternatively, the illustrated linear actuator may be replaced by an electric motor rotatably driving the drive link 64 and/or connector link 80 about the sixth pivot 82.

Alternatively, a trigger mechanism may be utilized between the linkage 20 and the overcenter arrangement 40 for moving the third pivot 52 in and out of the overcenter position in response to a corresponding articulation of the linkage 20. For example, as will be clear to those of skill in the art, the linkage 20 may include additional members that extend forwardly, with one of these members being interconnected with the overcenter arrangement 40 so as to move the third pivot 52 in and out of the overcenter position.

In another embodiment, a second overcenter arrangement helps to maintain the rear bow 30 in the closed position. More specifically, a second overcenter line 55 is defined by the third pivot 52 and the fourth pivot 66. The sixth pivot 82 is movable above the second overcenter line to an overcenter position to hold the rear bow 30 in the closed position. Movement of the sixth pivot 82 below the second overcenter line 55 allows pivotal movement of drive link 64 and the connector link 80 about the sixth pivot 82 and, in turn, movement of the rear bow 30 out of the closed position.

In a further alternative, the overcenter arrangement 40 may be articulated in other ways. As one example, an actuator may be directly connected to the overcenter arrangement 40 in order to move the rear bow between the closed and open positions. As a further example, an actuator may be interconnected with the overcenter arrangement using a different sent of links than illustrated, or links that connect in different positions than shown.

A cross member 100 may be supported along a forward end of the backlight assembly 44 and extend transversely across the vehicle to function as a bow for supporting and tensioning a portion of the cover 12 during movement of the top 10 between the closed and open positions. As known to those of skill in the art, such a bow may be referred to as a number four bow (even if not the fourth bow from the front), a corner bow or a styling bow. This bow defines the point at which the slope of the roof changes. Typically, such a bow is separately provided and maybe articulated to tension the top. In the illustrated embodiment, mounting the corner bow 100 to the overcenter arrangement 40 allows this bow to be articulated along with the rear bow (also referred to as a number five bow) and dispenses with an additional mechanism. In the illustrated embodiment, the corner bow is supported at the third pivot 52 just forward of the rear window 48. It could be supported, directly or indirectly, elsewhere on the overcenter arrangement 40, such as being mounted to the link 42.

In another embodiment of the invention, link 42 and backlight assembly 44 may form links of an articulating mechanism for providing movement of the rear bow 30 during movement of the top between the closed and open positions. In this case, the link 42 and backlight 46 are coupled by the third pivot 52, but does not necessarily function as an overcenter arrangement as in the previous embodiment.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:
1. A convertible top for a motor vehicle comprising:
   a cover;
   a linkage supporting a portion of the cover and providing movement of the top between an extended position extending over a passenger compartment and a retracted position disposed in a storage space adjacent the passenger compartment;
   a rear bow supporting a rear edge of the cover, the rear bow articulating the rear edge of the cover during movement of the top between the extended and retracted positions, the rear bow being movable between a closed position disposed adjacent to a body panel of the motor vehicle and a generally upwardly raised open position; and
   a backlight assembly having a rear window and supporting a rear portion of the cover, the backlight assembly being pivotally coupled with a rearward portion of the rear bow so as to provide a link in an articulating mechanism that provides movement of the rear bow during movement of the top between the extended and retracted positions;
   the articulating mechanism including a link pivotally coupled to the linkage by a first pivot;
   the backlight assembly being pivotally coupled to the rear bow by a second pivot; and
   the link and the backlight assembly being pivotally coupled to each other by a third pivot;
   wherein the first and second pivots define an overcenter line, the third pivot being in an overcenter position above the overcenter line when the top is in the extended position to maintain the rear bow in the closed position, the third pivot being out of the overcenter position below the overcenter line to allow articulation of the rear bow during movement of the top between the extended and retracted positions.

2. The convertible top as set forth in claim 1, further comprising an actuator operatively coupled to the articulating mechanism for actuating the third pivot in and out of the overcenter position.

3. The convertible top as set forth in claim 2, further including an actuator linkage operatively coupling the actuator to the articulating mechanism.

4. The convertible top as set forth in claim 3, wherein the actuator linkage includes a drive link having one end pivotally coupled to the linkage and a connector link having one end pivotally coupled to the articulating mechanism, the drive link and the connector link being pivotally interconnected, the actuator linkage being moved in and out of an overcenter position by the actuator.

5. A convertible top for a motor vehicle comprising:
a cover;
a backlight assembly having a rear window and supporting a rear portion of the cover;
a linkage supporting portions of the cover forward of the backlight, the linkage providing movement of the top between an extended position extending over a passenger compartment and a retracted position;
a rear bow supporting a rear edge of the cover, the rear articulating the rear edge of the cover during movement of the top between the extended and retracted positions, the rear bow being movable between a closed position disposed adjacent to a body panel of the motor vehicle and a generally upwardly raised open position; and
an overcenter arrangement operatively coupled between the linkage and the rear bow for retaining the rear bow in the extended position, the overcenter arrangement having first and second members pivotally coupled to each other by a pivot movable in and out of an overcenter position during movement of the top between the extended and retracted positions, respectively, the overcenter arrangement having the backlight assembly as one of the first or second members.

6. The convertible top as set forth in claim 5, further comprising an actuator operatively coupled to the overcenter arrangement for actuating the pivot in and out of the overcenter position.

7. The convertible top as set forth in claim 6, further including an actuator linkage operatively coupling the actuator to the overcenter arrangement.

8. The convertible top as set forth in claim 7, wherein the actuator linkage includes a drive link having one end pivotally coupled to the linkage and a connector link having one end pivotally coupled to the overcenter arrangement, the drive link and the connector link being pivotally interconnected, the actuator linkage being moved in and out of an overcenter position by the actuator.

9. The convertible top as set forth in claim 5, wherein the rear bow is pivotally coupled to the linkage.

10. The convertible top as set forth in claim 5, further comprising a corner bow for supporting the cover, the corner bow being interconnected with the overcenter arrangement forward of the rear window.

11. A convertible top for a motor vehicle comprising:
a cover;
a linkage supporting a portion of the cover and providing movement of the top between an extended position extending over a passenger compartment and a retracted position disposed in a storage space adjacent the passenger compartment;
a rear bow supporting a rear edge of the cover, the rear bow articulating the rear edge of the cover during movement of the top between the extended and retracted positions, the rear bow being movable between a closed position disposed adjacent to a body panel of the motor vehicle and a generally upwardly raised open position; and
a backlight assembly having a rear window and supporting a rear portion of the cover, the backlight assembly being a link in an articulating mechanism that provides movement of the rear bow during movement of the top between the extended and retracted positions;
the articulating mechanism including a link pivotally coupled to the linkage by a first pivot;
the backlight assembly being pivotally coupled to the rear bow by a second pivot; and
the link and the backlight assembly being pivotally coupled to each other by a third pivot;
wherein the first and second pivots define an overcenter line, the third pivot being in an overcenter position above the overcenter line when the top is in the extended position to maintain the rear bow in the closed position, the third pivot being out of the overcenter position below the overcenter line to allow articulation of the rear bow during movement of the top between the extended and retracted positions.

12. A convertible top far a motor vehicle comprising:
a cover;
a linkage supporting a portion of the cover and providing movement of the top between an extended position extending over a passenger compartment and a retracted position disposed in a storage space adjacent the passenger compartment;
a rear bow supporting a rear edge of the cover, the rear bow articulating the rear edge of the cover during movement of the top between the extended and retracted positions, the rear bow being movable between a closed position disposed adjacent to a body panel of the motor vehicle and a generally upwardly raised open position; and
a backlight assembly having a rear window and supporting a rear portion of the cover, the backlight assembly being a link in an articulating mechanism that provides movement of the rear bow during movement of the top between the extended and retracted positions;
an actuator; and
an actuator linkage operatively coupling the actuator to the articulating mechanism, the actuator linkage including a drive link having one end pivotally coupled to the linkage and a connector link having one end pivotally coupled to the articulating mechanism, the drive link and the connector link being pivotally interconnected;
wherein the actuator linkage is moved in and out of an overcenter position by the actuator.

* * * * *